United States Patent
Yi et al.

(10) Patent No.: US 8,099,111 B2
(45) Date of Patent: Jan. 17, 2012

(54) VEHICLE TELEMATICS DATA LOGGING

(75) Inventors: Ki Hak Yi, Windsor (CA); Sethu K. Madhavan, Canton, MI (US)

(73) Assignee: General Motors LLC, Detroit, MI (US)

( * ) Notice: Subject to any disclaimer, the term of this patent is extended or adjusted under 35 U.S.C. 154(b) by 342 days.

(21) Appl. No.: 12/541,750

(22) Filed: Aug. 14, 2009

(65) Prior Publication Data

US 2011/0039528 A1 Feb. 17, 2011

(51) Int. Cl.
*H04Q 7/20* (2006.01)
(52) U.S. Cl. .................. 455/456.5; 455/440; 340/989
(58) Field of Classification Search .................. 455/418, 455/429, 440, 456.1, 456.5, 457; 340/989
See application file for complete search history.

(56) References Cited

U.S. PATENT DOCUMENTS

| | | | |
|---|---|---|---|
| 6,389,288 B1 * | 5/2002 | Kuwahara et al. | 455/456.6 |
| 6,745,028 B1 * | 6/2004 | Hutchinson | 455/427 |
| 7,130,644 B2 * | 10/2006 | Kuwahra et al. | 455/456.3 |
| 7,474,873 B2 * | 1/2009 | Hutchinson | 455/12.1 |
| 8,019,354 B2 * | 9/2011 | Rae et al. | 455/456.1 |

* cited by examiner

*Primary Examiner* — Nhan Le
(74) *Attorney, Agent, or Firm* — Anthony L. Simon; Reising Ethington P.C.

(57) ABSTRACT

A system and method for data logging of telematics events by a vehicle telematics unit. Upon detection of a telematics event, checks are made to determine if location data logging is enabled and if the telematics event is an incoming personal call. If the location data logging is enabled and the telematics event is not an incoming personal call, then a data log entry is created that includes the current vehicle location; otherwise, a data log entry without any location information is created. Thereafter, the data log entries can be uploaded to a call center for analysis. Procedures for handling data logging during a standby mode of the telematics unit are also provided.

16 Claims, 2 Drawing Sheets

VEHICLE TELEMATICS DATA LOGGING

TECHNICAL FIELD

The present invention relates generally to vehicle telecommunications and, more particularly, to techniques for recording vehicle telematics events for subsequent analysis and use.

BACKGROUND OF THE INVENTION

The provision of vehicle telematics services is a complex operation involving dedicated call center services, advanced electronics in the vehicle, and specialized communications approaches between the vehicle and call center so as to permit not only voice communication, but data and command control as well, all in an environment that should include adequate authentication and security to prevent inadvertent and intentional vehicle access by entities other than the call center or other authorized users. When there is a communication failure between the vehicle and call center or other source, it can therefore be due to any of a variety of reasons, many of which may not be readily determinable.

SUMMARY OF THE INVENTION

According to an aspect of the invention, there is provided a data logging method for use in a vehicle telematics system. The method comprises the steps of (a) detecting a telematics event involving communication between a vehicle telematics unit and a wireless carrier system; (b) determining if the telematics event is an incoming personal call to the telematics unit; (c) determining if location data logging is enabled; (d) creating a data log entry identifying the telematics event if the event is something other than an incoming personal call; and (e) including vehicle location data with the data log entry if enabled.

According to another aspect of the invention, there is provided a data logging method that comprises the steps of (a) detecting a telematics event at a vehicle telematics unit; (b) determining if location data logging is enabled; (c) determining if the telematics unit is in a standby mode; (d) creating a data log entry identifying the telematics event and including vehicle location data if enabled; (e) storing the data log entry for subsequent upload once the telematics unit switches from the standby mode to an active mode; and (f) sending the data log entry from the telematics unit to a call center following the switch from standby mode to the active mode An advantage of the disclosed data logging approaches is that they can be used to provide detailed information concerning telematics events occurring at the vehicle, and that information can then be used for various purposes, such as fault diagnosis, recordkeeping, and tracking of the events. The method can include steps that enable it to operate according to a privacy policy that can be controlled by the telematics services subscriber.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The system and methods described below can be used by a vehicle telematics unit to log telematics events involving communication between the telematics unit and a wireless carrier system such as a cellular network. Upon an event occurring, data relating to the event is stored for subsequent uploading to a call center. Data identifying vehicle location at the time of each logged telematics unit event can be included as well. When processed during a standby mode of the telematics unit, the logged data can be stored for later uploading once the telematics unit becomes active and able to communicate with a call center.

Communications System—

Figure 1:
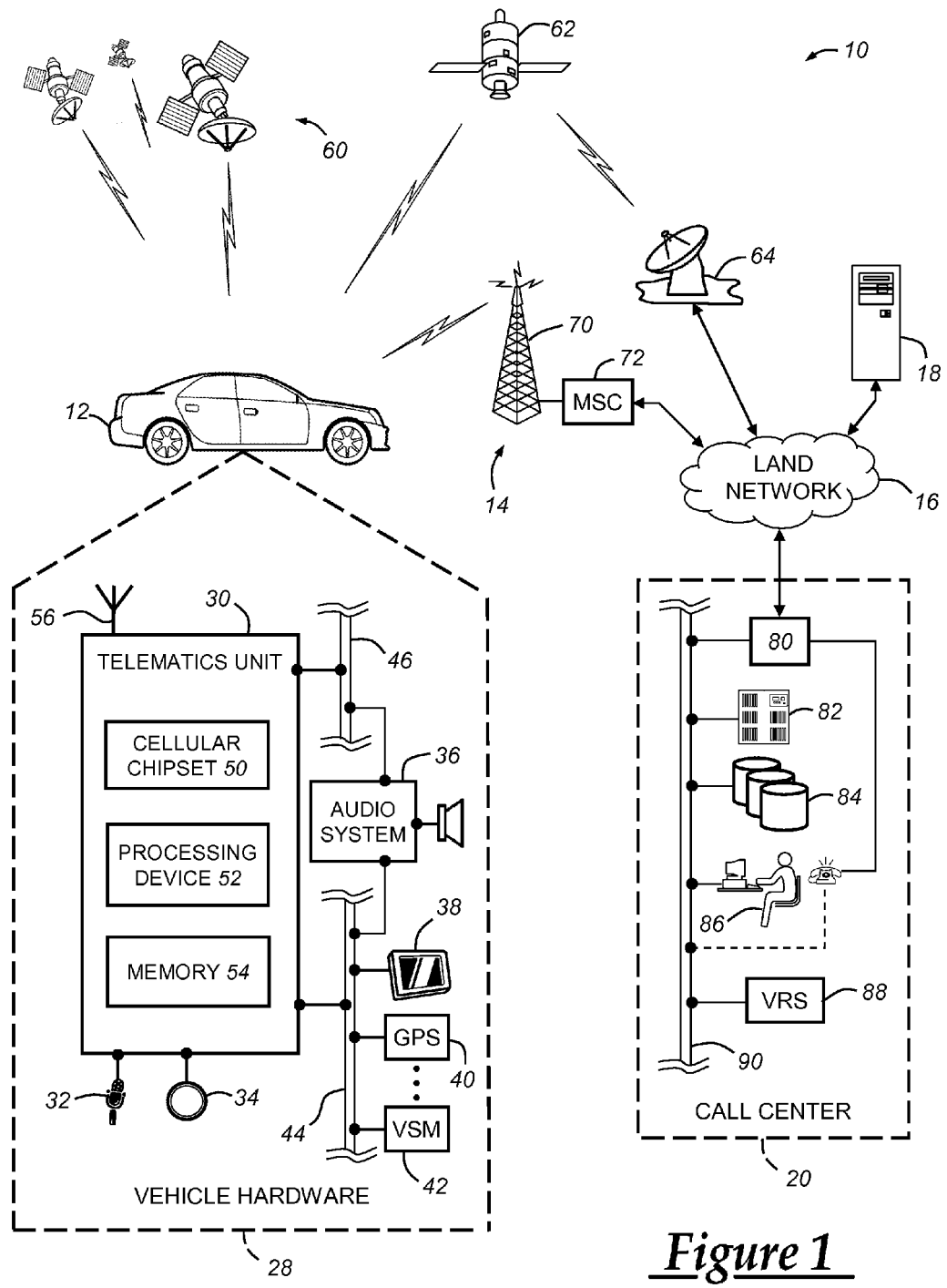
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle telematics unit (VTU) 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc.

Data can be sent either via a data connection, such as via short message service (SMS) or packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to GSM, W-CDMA, or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols used in the wireless industry such as 3 gpp or 3 gpp2. Wireless networking between the vehicle and other networked devices can also be carried out using telematics unit 30. For this purpose, telematics unit 30 can be configured to communicate wirelessly according to one or more protocols implemented per 3 gpp or 3 gpp2 standards and also other wireless protocols, such as any of the IEEE 802.11 protocols, WiMAX, or Bluetooth. When used for packet-switched data communication such as TCP/IP, the telematics unit can be configured with a static IP address or can be set up to automatically receive a dynamically assigned IP address from another device on the network, such as from a router or from a network address server (e.g., a DHCP server).

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14.

For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as 2G CDMA (IS-95), 3G CDMA2000 (IS-2000, 1XRTT, EVDO), 2G/2.5G GSM (GPRS, EDGE), or 3G W-CDMA (UMTS, HSPA). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, a packet-switched data network (PSDN), and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. For example, computer 18 can be connected to one or more of the other system 10 components via a private or virtual private network (VPN) implemented through a leased line or Internet ISP in the PSDN. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless local network using protocols such as 802.11x and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
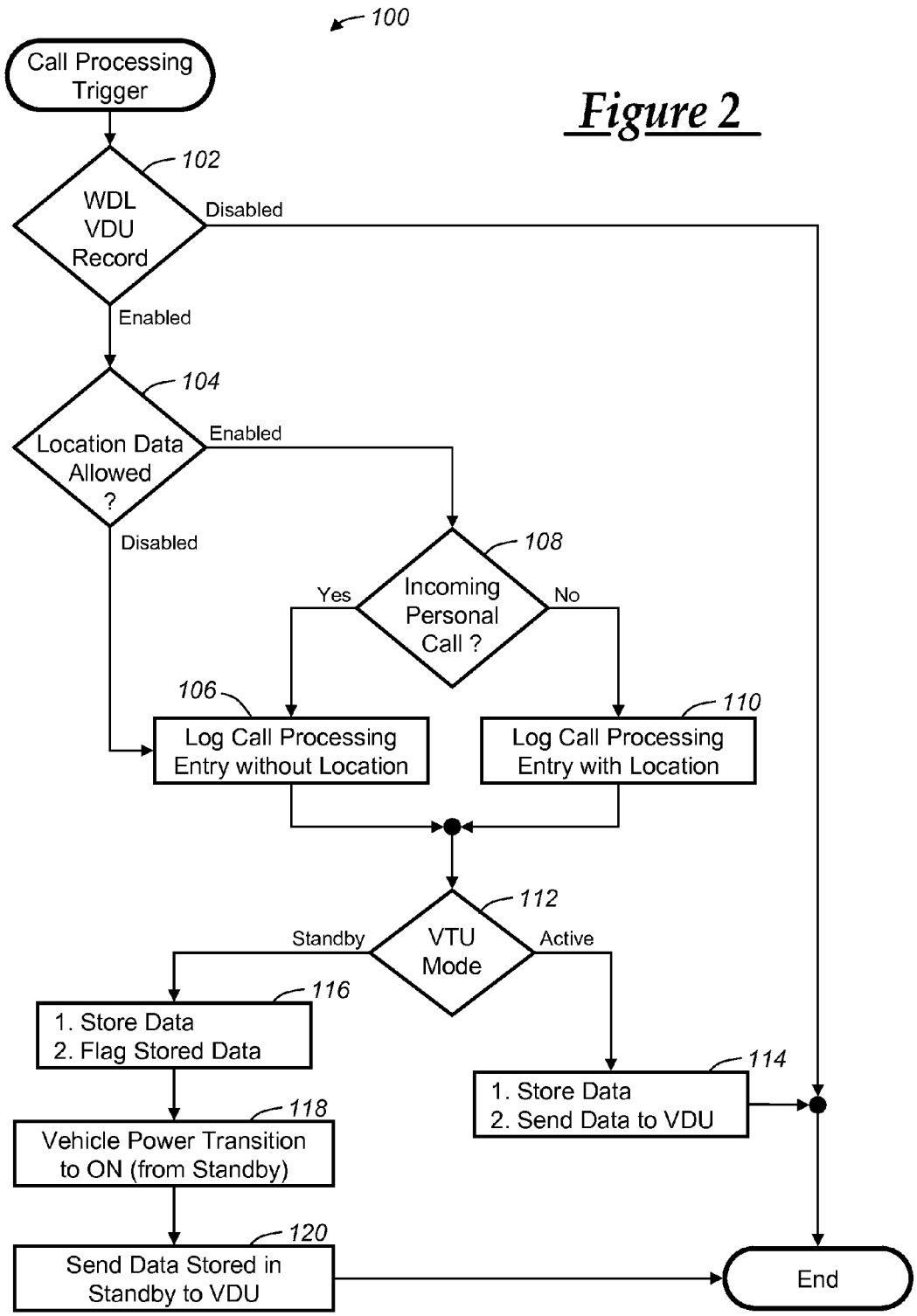
FIG. 2 is a flowchart of a data logging method that can be used in conjunction with the communications system of FIG. 1.

Turning now to FIG. 2, there is shown a method 100 for wireless data logging of telematics events which primarily include events involving communication between the vehicle telematics unit 30 and wireless carrier system 14. In general, the method involves detecting an occurrence of a telematics event, determining what data is to be stored, and then creating a data log entry of the desired data for subsequent uploading to the call center 20. The data log entry can be uploaded as a part of a collection of data log entries and this uploading can occur either at scheduled times, or intermittently as needed or desired, or on an ad hoc basis as communication with the call center becomes available or is established either specifically to upload the log entries or for other reasons. In this regard, the data log entries can also be uploaded in response to a call center (e.g., advisor) initiated request, either during an existing call with the call center, or by setting a trigger in the telematics unit from the call center that then subsequently causes the telematics unit to call into the call center and upload in the data log entries. The programming and communication techniques to accomplish these and other such approaches to data uploading are known to those skilled in the art.

The method 100 begins in response to a call processing trigger that occurs in the telematics unit. The call processing trigger is a telematics event for which the telematics unit is programmed to detect. Examples of different call processing triggers are given in Table 1 below. The various telematics events primarily involve communication with the wireless carrier system, and some involve communication via the wireless carrier system to a remote destination such as the call center (e.g., event code 5), whereas others relate to communication only between the telematics unit and carrier system (e.g., event code 12). Some can even involve only activity at the vehicle telematics unit without necessarily involving communication with the wireless carrier system (e.g., event code 11).

TABLE 1

| Event Code | Description |
| --- | --- |
| 0 | Voice Call Origination (Teleservice ID 11) |
| 1 | Incoming Voice Page Received (Teleservice ID 11) |
| 2 | SMS Origination (Teleservice ID 22) |
| 3 | SMS Termination (Teleservice ID 21) |
| 4 | Packet Data Origination (GPRS/EDGE, bearer service 70) |
| 5 | Failure to establish data mode during cellular origination process |
| 6 | Initial switch to voice success (AIF21) |
| 7 | Authentication failure (AIF27/28) |
| 8 | DCM Tx Message Time-out |
| 9 | Switch to Voice failure (AIF21) |
| 10 | Application Level Timeout (time-out of AIF transaction) |
| 11 | Any NAD failure event. |
| 12 | Network Initiated OTA (including PP-SMS) |
| 13 | Device Initiated OTA (including PP-SMS) |
| 14 | A termination of the call event generated when a call is released without any failure modes during the entire duration of the call |

Following occurrence of a call processing trigger, the process moves to step 102 where it checks for a vehicle data upload (VDU) record for the wireless data logging (WDL) operation. Use of this WDL VDU record allows the telematics unit to be programmed to either permit data logging or not, and this configuration can be changed at any time if desired. Thus, a vehicle owner or other authorized user of the vehicle can subscribe to the data logging service, or it can be a default process that is carried out unless opt-out of by the user. Alternatively, use of the data logging can be controlled by the telematics service provider (who operates the call center) regardless of subscriber involvement. The VDU record can be one of a number of different records stored at the vehicle and relating to different features or types of data to be uploaded to the call center. The VDU record is used by the telematics unit as a part of a VDU process carried out by the telematics unit to control periodic uploading of data to the call center. Thus, data sent to the VDU process is managed by that process along with data received from other processes or from other vehicle system modules over the communication bus 44. Then, at the appropriate time, the VDU process communicates with the call center and uploads whatever data is pending for delivery to the call center. In this way, the method 100 does not itself have to handle and coordinate communication with the call center, but rather it logs the desired data and makes it available to the VDU process to upload when appropriate. Other ways of handling the actual communication of logged data to the call center will be apparent to those skilled in the art; for example, the method 100 can itself include suitable programming to directly handle the uploading, or the data can be extracted from the vehicle via a OBDII port or using a local wireless network node at a dealership or otherwise using, for example, an 802.11 communication protocol.

If, at step 102 there is no WDL VDU record, or there is one that indicates that wireless data logging is disabled, then the process terminates. Assuming that data logging is enabled, the process moves to step 104 to check to see if location data logging is enabled. Location data logging permits the process to record the vehicle location at the time the telematics event occurred. This information can be useful in tracking telematics events, and specifically for certain types of events, such as wireless carrier link problems that may occur in certain geographic locations. By storing the location data of the vehicle when the event occurred, it and perhaps other such events from the vehicle or other similarly-equipped vehicles can be correlated at the call center or other remote facility to determine network and location-related communication problems. The check at step 104 permits this feature to be turned on or off (i.e., enabled or disabled), and this can be specified in the WDL VDU record or elsewhere such as by using a flag or code that indicates whether the location data logging is permitted or not. If not enabled, the process moves to step 106 where the call processing trigger is logged without any location data being stored. This logging is done by creating a data log entry having various information associated with the telematics event, as will be described in greater detail below.

If location data logging is enabled, then the process moves from step 104 to step 108 where a check is made to determine whether or not the telematics event is an incoming personal call, such as a voice call from someone to the driver of the vehicle. If so, then the telematics event will be logged at step 106 without location data even if that feature is enabled. This check at step 108 avoids storage of location data that is not typically needed for later diagnostic or other uses. It can also be used to prevent personal use of the telematics unit from being tracked by location. In this way, the process can implement a privacy policy of the telematics service provider to help insure privacy protection for the vehicle user. If desired, use of this step 108 can be optional or configurable (i.e., either included or skipped) by the subscriber or call center either during the initial setup and configuration of the telematics services or via a web portal such as computer 18 so that it can be selectively enabled or disabled as desired. If configurable by the subscriber or call center, then a suitable enabling flag or code can be stored in the WDL VDU record or elsewhere on the vehicle. In another embodiment, this step 108 can check not just for incoming personal calls, but for outgoing personal calls as well and skip storage of location data for outgoing personal calls only or for both types of personal calls. Determination of an outgoing personal call versus one to the call center can be on the basis of the user input at the vehicle user interface and/or based on the dialed number.

If the telematics event is not an incoming personal call then the process moves to step 110 where the data log entry is created and includes the current vehicle location. In either event, the process moves from steps 106 and 110 to block 112 where a check is made to determine if the vehicle telematics unit (VTU) is in the active or standby mode. As will be known to those skilled in the art, the telematics unit can periodically enter into a low power standby mode in which it ceases communication with the wireless carrier system to conserve power. This can occur, for example, each time the vehicle ignition is turned off. If, at step 112 the vehicle is on or the telematics unit is otherwise in the active state, the process moves to step 114 where the data log entry is stored and then sent immediately or subsequently to the VDU process for uploading to the call center. If instead the telematics unit is in the standby mode, then the process moves to step 116 where the data log entry is stored (e.g., by appending it onto a collection of prior data log entries) and a standby flag is set to indicate that it was recorded while the telematics unit was in the standby mode. At step 118, once the vehicle is powered on such that the telematics unit switches back to its active mode, then at step 120 the stored data is sent to the VDU process for uploading. In this way, the method 100 can log the telematics events even during the standby mode when the VDU process is not running and can then later inform the VDU process about the data log entries once it has been restarted. Thus, for data stored during the standby mode, it can be sent based on the standby flag following a change in state of telematics unit back to the active mode. Steps 118 and 120 can be implemented as a part of the method 100 or as a separate process. As will be appreciated, sending the data log entries to the VDU process does not require actual transmission of the data within or from the telematics unit, but can be done simply by informing the VDU process that there are data log entries available for uploading. The data log entries can be sent on a first-in-first-out basis, or otherwise as desired.

Table 2 depicts an example of the content of a data log entry. As shown, the data log entry can be a logical record having a plurality of fields of different data relating to the telematics event being reported.

TABLE 2

| Category | Description |
| --- | --- |
| Header | Telematics Unit ID |
| Standby | Standby Flag |
| Call Type | Call Request Type |
| Event | Event Code, NAD code |
| Comm. Mode | Voice Mode |
|  | Data Mode |
| Timestamp | Date and UTC time |
| Location | Latitude/Longitude |
| Aged | Aged Data Indicator |
| Local Network | Preferred PLMN Version |
|  | Teleservice ID or Bearer Type (GPRS or EDGE) |
|  | PLMN |
|  | Access Technology |
|  | ARFCN |
|  | BSIC |
|  | Vocoder Type |
|  | Location Area Code or Routing Area Code |
| Network Access | Dialed Number, etc. |

The listed fields are exemplary only and their use and purpose will be apparent to those skilled in the art. The Aged Data Indicator can be a Boolean data item (True or False) to indicate whether the estimated horizontal position error in the location data is too large for the location data to be used reliably. The Call Type can be a code or other indicator of the content of a call being logged by the process. For example, calls originated to the call center for such purposes as reporting a detected collision, requesting roadside assistance, navigation assistance, etc. can each have their own call type code. This code can be established based on the occupant's use of the vehicle user interface (e.g., a voice menu command requesting navigation assistance can be used to select the proper code for insertion into the Call Type field of the data log entry). Other call types including incoming calls and those not involving the call center can be identified in this field as well. Similarly, network-only communications such as an OTA programming session can have a unique call type code associated with it.

The location data stored in the data log entry can be GPS location data obtained via the communication bus 44 from the GPS module 40. This can be in the form of latitude and longitude coordinates or otherwise as desired or appropriate. The dialed number stored in the data log entry can be the number (including "+") on the NAD; that is, not the number entered by the user through the vehicle user interface, due to call re-routing. For packet data connections from the telematics unit via the wireless carrier system, the destination IP address can be stored in the Network Access field.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A data logging method for use in a vehicle telematics system, comprising the steps of:
   (a) detecting a telematics event involving communication between a vehicle telematics unit and a wireless carrier system;
   (b) determining if the telematics event is an incoming personal call to the telematics unit;
   (c) determining if location data logging is enabled;
   (d) creating a data log entry identifying the telematics event if the event is something other than an incoming personal call; and
   (e) including vehicle location data with the data log entry if enabled.

2. A data logging method as defined in claim 1, further comprising the step of determining if the telematics unit is in a standby mode and, if so, then storing the data log entry for subsequent transmission to a call center.

3. A data logging method as defined in claim 2, wherein, following a change in state from the standby mode to an active mode, the method further comprises sending the data log entry to the call center via the wireless carrier system.

4. A data logging method as defined in claim 3, further comprising the step of setting a standby flag associated with storing of the data log entry indicating that the data log entry was recorded during the standby mode, and wherein the sending step further comprises sending the data log entry based on the standby flag following the change in state to the active mode.

5. A data logging method as defined in claim 3, wherein the sending step further comprises sending the data log entry to a vehicle data upload process in the telematics unit following the change in state to the active mode, and then subsequently uploading the data log entry to the call center by the vehicle data upload process along with other data.

6. A data logging method as defined in claim 1, further comprising the steps of determining if wireless data logging is enabled and, if so, carrying out at least steps (b) through (e).

7. A data logging method as defined in claim 6, wherein the step of determining if wireless data logging is enabled further comprises checking a stored vehicle data upload record indicating whether wireless data logging is enabled for the telematics unit.

8. A data logging method as defined in claim 7, wherein step (c) further comprises determining from the vehicle data upload record whether location data logging is enabled.

9. A data logging method as defined in claim 1, wherein step (a) further comprises detecting a call processing trigger relating to use of the telematics unit for communication with the wireless carrier system and carrying out steps (b) through (e) in response to the detected call processing trigger.

10. A data logging method as defined in claim 9, wherein the data log entry includes a plurality of fields including an identifier associated with the telematics unit and a call request type indicative of content communicated between the telematics unit and call center during a call associated with the call processing trigger.

11. A data logging method as defined in claim 1, wherein, when location data logging is enabled, step (e) further comprises obtaining GPS data from a GPS receiver on-board the vehicle and recording the GPS data with the data log entry.

12. A data logging method as defined in claim 1, further comprising the step of sending the data log entry to a call center via the telematics unit.

13. A data logging method for use in a vehicle telematics system, comprising the steps of:
(a) detecting a telematics event at a vehicle telematics unit;
(b) determining if location data logging is enabled;
(c) determining if the telematics unit is in a standby mode;
(d) creating a data log entry identifying the telematics event and including vehicle location data if enabled;
(e) storing the data log entry for subsequent upload once the telematics unit switches from the standby mode to an active mode; and
(f) sending the data log entry from the telematics unit to a call center following the switch from standby mode to the active mode.

14. A data logging method as defined in claim 13, wherein step (a) further comprises detecting a call processing trigger relating to use of the telematics unit for communication with a wireless carrier system and carrying out steps (b) through (f) in response to the detected call processing trigger.

15. A data logging method as defined in claim 14, wherein the data log entry includes a plurality of fields including an identifier associated with the telematics unit and a call request type indicative of content communicated between the telematics unit and call center during a call associated with the call processing trigger.

16. A data logging method as defined in claim 13, wherein step (d) further comprises creating the data log if the telematics event is something other than an incoming personal call.

* * * * *